United States Patent
Abidi et al.

(10) Patent No.: US 9,503,278 B2
(45) Date of Patent: Nov. 22, 2016

(54) REFLECTIVE RELAY PROCESSING ON LOGICAL PORTS FOR CHANNELIZED LINKS IN EDGE VIRTUAL BRIDGING SYSTEMS

(71) Applicant: LENOVO Enterprise Solutions (Singapore) PTE, LTD., New Tech Park (SG)

(72) Inventors: Vasmi M. Abidi, Cupertino, CA (US); Xiang Hui Dong, Wuxi (CN); Tamanna Z. Sait, San Jose, CA (US); Yun Sun, Wuxi (CN); Zheng Dong Zhu, Wuxi (CN)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 508 days.

(21) Appl. No.: 13/971,636

(22) Filed: Aug. 20, 2013

(65) Prior Publication Data
US 2015/0055658 A1   Feb. 26, 2015

(51) Int. Cl.
*H04L 12/28* (2006.01)
*H04L 12/46* (2006.01)

(52) U.S. Cl.
CPC .............. *H04L 12/465* (2013.01); *Y02B 60/43* (2013.01); *Y02B 60/44* (2013.01)

(58) Field of Classification Search
USPC .................. 370/252, 395, 330, 331, 293
See application file for complete search history.

(56) References Cited

U.S. PATENT DOCUMENTS

| | | | |
|---|---|---|---|
| 8,238,340 B2 | 8/2012 | Mack-Crane et al. | |
| 8,509,062 B2 | 8/2013 | Arseneault et al. | |
| 2009/0279558 A1* | 11/2009 | Davis | H04L 45/00 370/412 |
| 2012/0243435 A1 | 9/2012 | Saltsidis et al. | |
| 2012/0291029 A1 | 11/2012 | Kidambi et al. | |

OTHER PUBLICATIONS

Kamath, Daya et I.; "Edge Virtual Bridge Proposal", Version 0, Rev 0.1.*
Mell, P. et al., "The NIST Definition of Cloud Computing", Special Publication, Version 15, Oct. 7, 2009, 2 pages, National Institute of Standards and Technology, Information Technology Laboratory, USA.
LAN/MAN Standards Committee of the IEEE Computer Society, "IEEE P802.1Qbg/D2.2, Draft Standard for Local and Metropolitan Area Networks, MAC Bridges and Virtual Bridged Local Area Networks—Amendment XX: Edge Virtual Bridging", Feb. 18, 2012, pp. i-187, IEEE, New York, USA.

* cited by examiner

*Primary Examiner* — Zewdu A Beyen
(74) *Attorney, Agent, or Firm* — Kunzler Law Group; Katherine S. Brown

(57) ABSTRACT

Embodiments of the invention relate to reflective relay (RR) processing on logical ports for channelized links in edge virtual bridging (EVB) systems. One embodiment includes providing a virtual edge bridge (VEB) mode and a virtual Ethernet port aggregator (VEPA) mode in an EVB system on a same port of a physical switch. RR capability per channel is negotiated between a server and the physical switch in the EVB system. RR per channel is supported on the physical switch of the EVB system using RR setting information per channel.

20 Claims, 9 Drawing Sheets

| Bits | Name | Description |
|---|---|---|
| ... | ... | ... |
| xx-xx | PORT_BITMAP | Bitmap to indicate the port members that belong to this VLAN |
| xx-xx | UT_PORT_BITMAP | Untag port bitmap. Indicates on which port the packet needs to be sent untagged. |
| ... | ... | ... |
| xx-xx | STG | Spanning Tree Group Number. |
| xx | VALID | Indicates if the entry is valid |

FIG. 10

| Bits | Name | Description |
|---|---|---|
| ... | ... | ... |
| xx-xx | PORT_RR_BITMAP | Bitmap to indicate if reflective relay set on the port and VLAN |
| xx-xx | PORT_BITMAP | Bitmap to indicate the port members that belong to this VLAN |
| xx-xx | UT_PORT_BITMAP | Untag port bitmap. Indicates on which port the packet needs to be sent untagged. |
| ... | ... | ... |
| xx-xx | STG | Spanning Tree Group Number. |
| xx | VALID | Indicates if the entry is valid |

FIG. 11

PORT_RR_BITMAP

FIG. 12

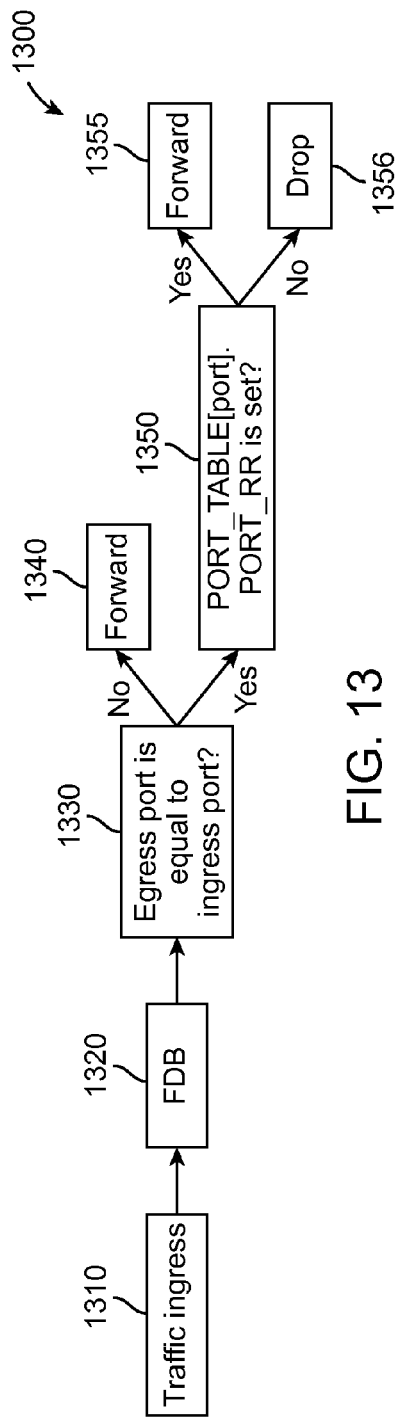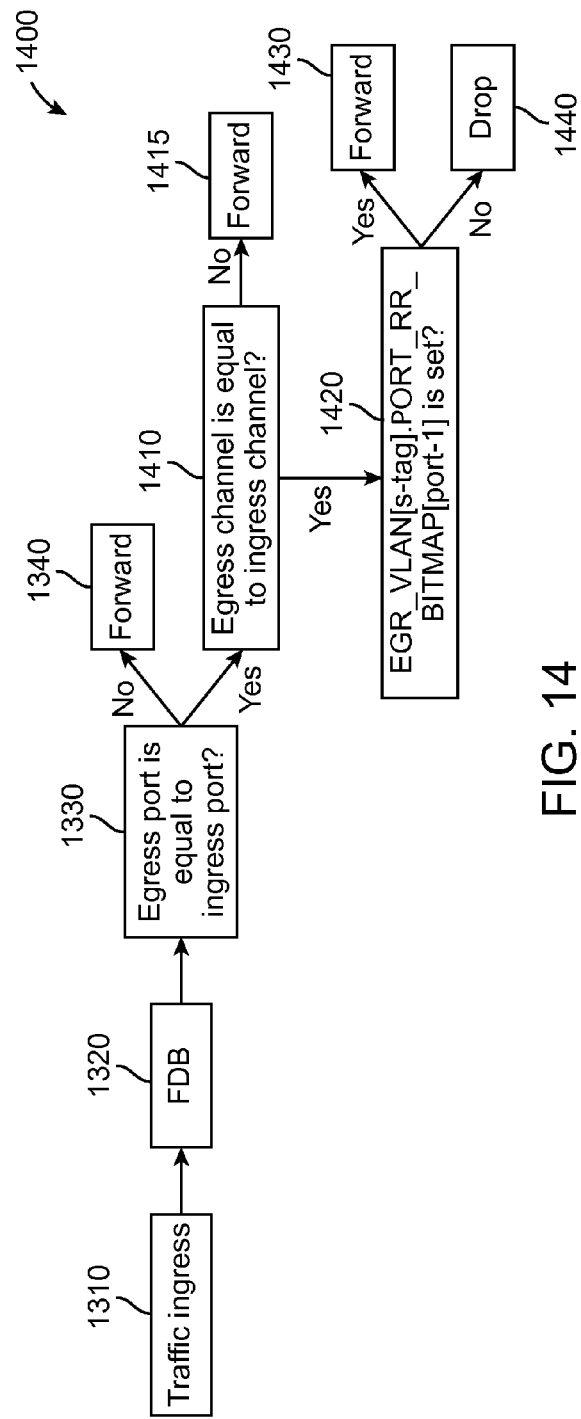

REFLECTIVE RELAY PROCESSING ON LOGICAL PORTS FOR CHANNELIZED LINKS IN EDGE VIRTUAL BRIDGING SYSTEMS

BACKGROUND

Embodiments of the invention relate to edge virtual bridging (EVB) environments, and in particular, reflective relay processing on logical ports for channelized links in EVB systems.

Edge Virtual Bridging (EVB) (IEEE 802.1Qbg) allows for two possible modes of operation for hypervisor host-internal switches: Virtual Ethernet Bridge (VEB) and Virtual Ethernet Port Aggregator (VEPA). VEB mode allows virtual machine (VM) network traffic to be switched internally to the hypervisor host whenever the network traffic is between VMs on the same host. VEPA mode allows the host-internal switch to acts as a port aggregator such that all VM traffic is first passed to the physical switch for processing. The physical network switches must support reflective relay (RR) in order to allow the VEPA mode of operation.

RR is configured on a switch that receives VM aggregated packets, such as VEPA packets, as some of these packets might be sent back to the server destined for another VM on the same server. RR returns those packets to the original device using the same downstream port that delivered the packets to the physical switch.

BRIEF SUMMARY

Embodiments of the invention relate to reflective relay (RR) processing on logical ports for channelized links in edge virtual bridging (EVB) systems. One embodiment includes providing a virtual edge bridge (VEB) mode and a virtual Ethernet port aggregator (VEPA) mode in an EVB system on a same port of a physical switch. RR capability per channel is negotiated between a server and the physical switch in the EVB system. RR per channel is supported on the physical switch of the EVB system using RR setting information per channel.

Another embodiment comprises a computer program product for RR processing on logical ports for channelized links in an EVB system. The computer program product comprising a computer readable storage medium having program code embodied therewith. The program code readable/executable by a processor to perform a method comprising: providing, by a server, a VEB mode and a VEPA mode in the EVB system on a same port of a physical switch. In one embodiment, the server negotiates RR capability per channel between the server and the physical switch in the EVB system. RR per channel is supported on the physical switch of the EVB system using RR setting information per channel.

One embodiment comprises an EVB system. The system comprises a physical switch and a physical end station including a hypervisor. In one embodiment, the physical end station provides a VEB mode and a VEPA mode on a same port of the physical switch. In one embodiment, the physical end station further negotiates RR capability per channel with the physical switch, and supports RR per channel on the physical switch using RR setting information per channel.

These and other features, aspects and advantages of the present invention will become understood with reference to the following description, appended claims and accompanying figures.

BRIEF DESCRIPTION OF THE SEVERAL VIEWS OF THE DRAWINGS

FIG. 10 illustrates a representation of a VLAN table;

FIG. 11 illustrates a representation of a modified EGR_V-LAN table, in accordance with an embodiment of the invention;

FIG. 12 illustrates a format of a reflective relay (RR) bitmap, in accordance with an embodiment of the invention;

FIG. 13 illustrates a block diagram showing a process for RR per port; and

FIG. 14 is a block diagram showing a process for RR per S-channel, in accordance with an embodiment of the invention.

DETAILED DESCRIPTION

Figure 1:
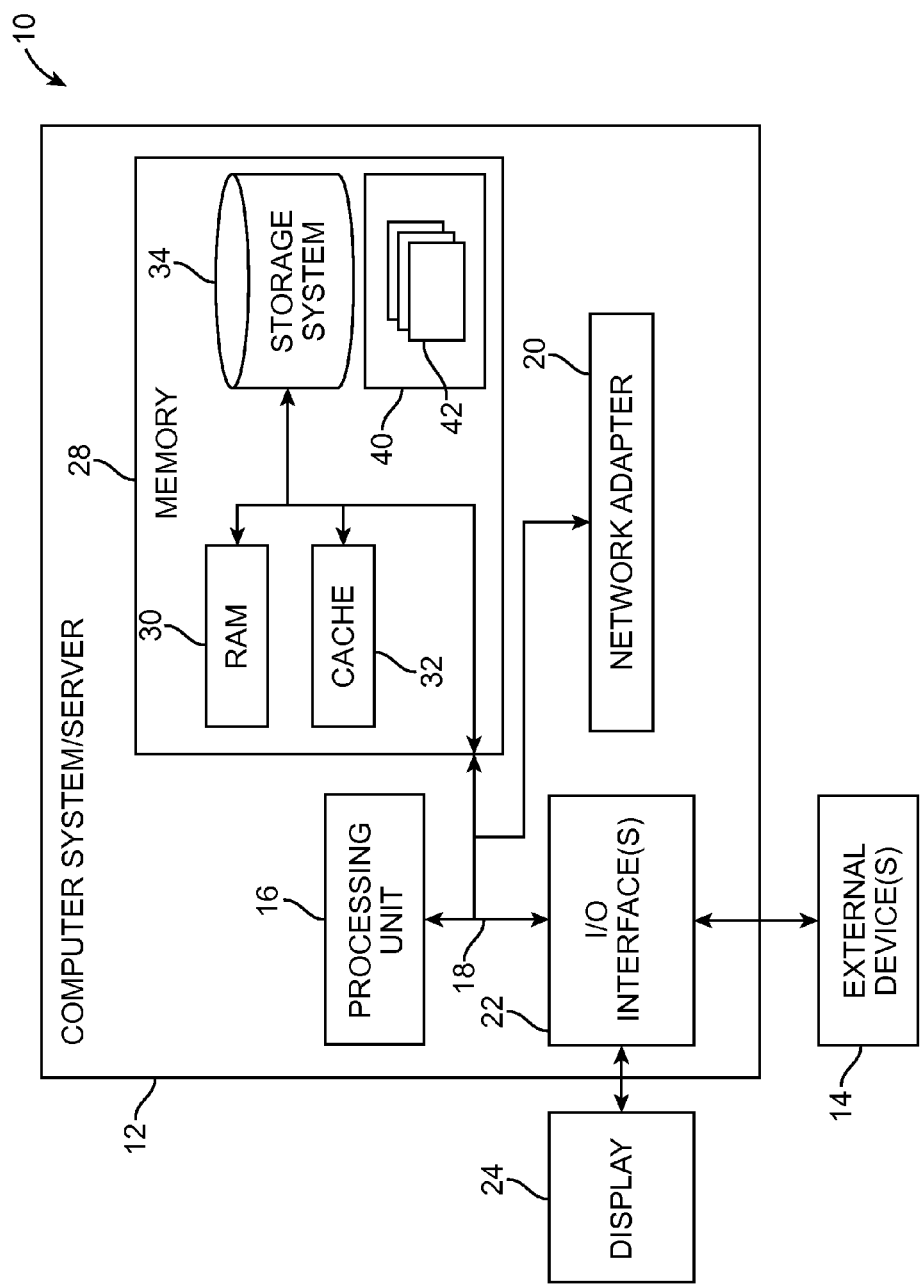
FIG. 1 depicts a cloud computing node according to an embodiment of the present invention.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
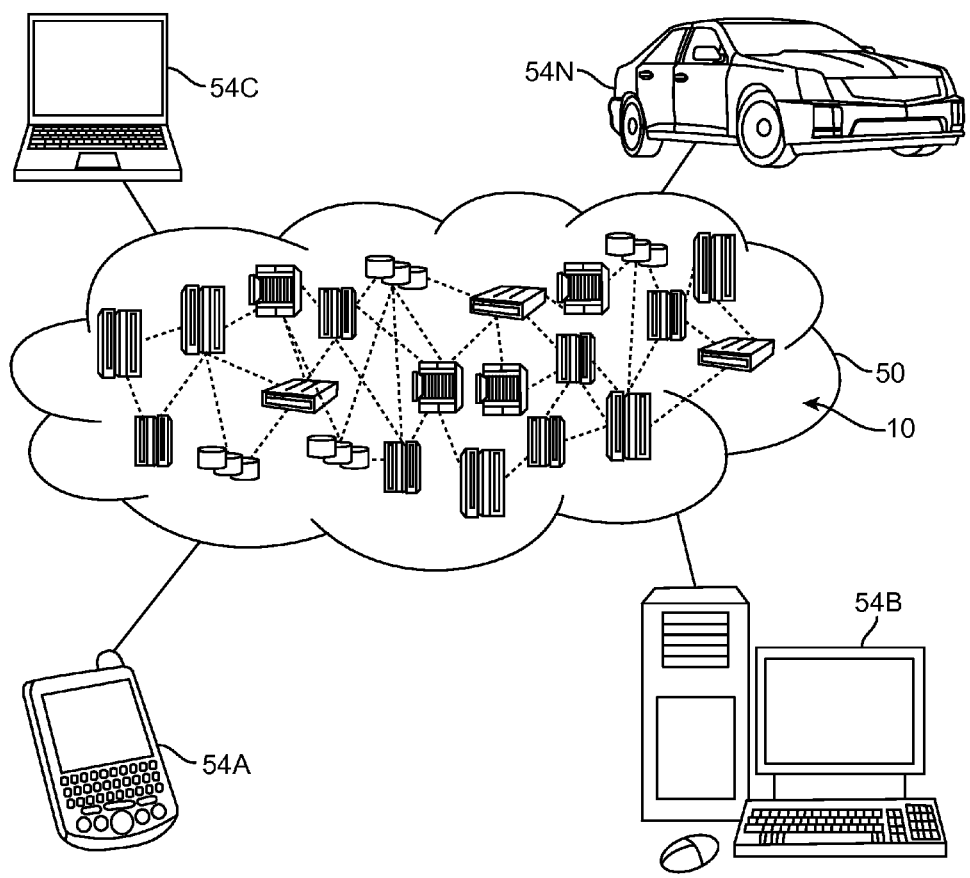
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
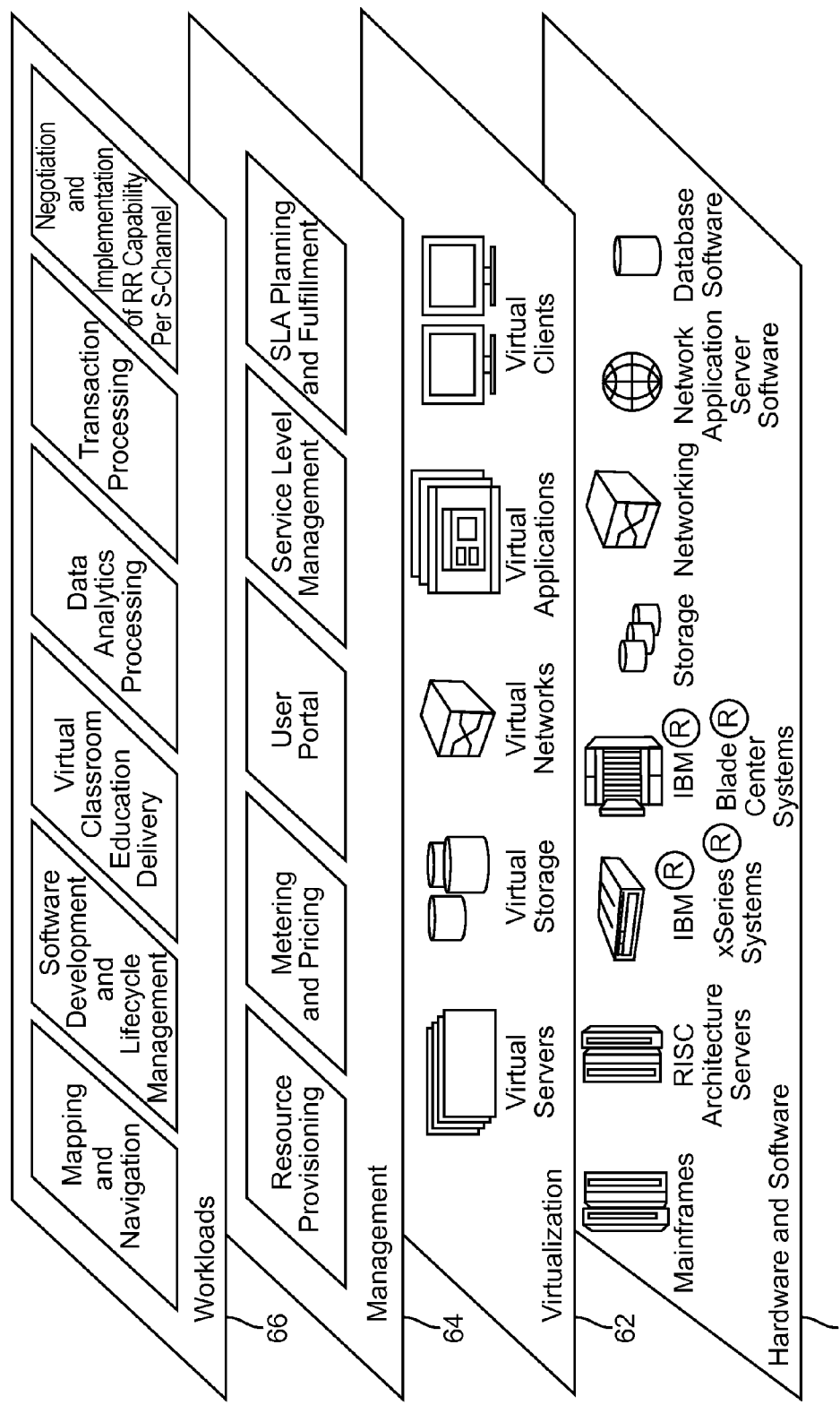
FIG. 3 depicts an abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and negotiation and implementation of RR capability per S-channel. As mentioned above, all of the foregoing examples described with respect to FIG. 3 are illustrative only, and the invention is not limited to these examples.

It is understood all functions of the present invention as described herein are typically performed by the system 100 (FIG. 4) using one or more embodiments, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

According to an embodiment of the invention, a RR process on logical ports for channelized links in an EVB environment is implemented by the system 100 and comprises providing a VEB mode and a VEPA mode in an EVB system on a same port of a physical switch. RR capability per channel is negotiated between a server and the physical switch in the EVB system. RR per channel is supported on the physical switch of the EVB system using RR setting information per channel. One or more embodiments provide a process to negotiate capability of RR per channel on s-channel mode between a server and a physical switch, and also provide support of RR per channel on the switch side of an EVB system.

Figure 4:
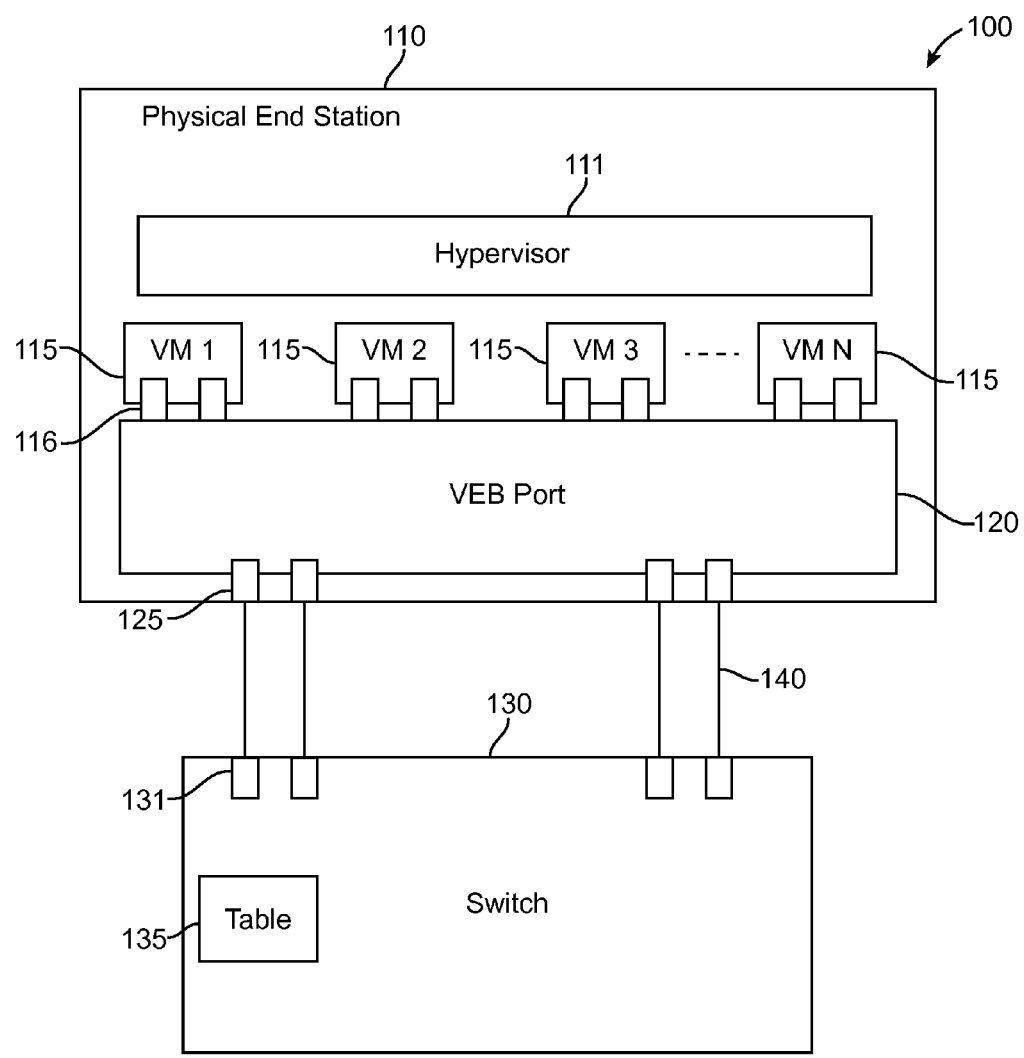
FIG. 4 is a block diagram illustrating an EVB system for employing an embodiment of the present invention.

FIG. 4 shows a block diagram illustrating an EVB system 100 for employing an embodiment of the present invention. EVB system 100 includes a physical end station (e.g., a server, etc.) 110 that includes a hypervisor 111, VM 1 115 to VM N 115, and virtual edge bridge (VEB) port 120. The VMs 1-N 115 include virtual interfaces 116 (e.g., virtual network interface card (VNIC), or VM NIC), applications, and operating systems. The VEB port 120 includes physical NICs 125 and communicates (e.g., ingress and egress) information (e.g., system traffic, network traffic, data, messages, etc.) with physical switch 130 (e.g., an adjacent bridge) through a VEB uplink 140 via switch ports 131.

The switch 130 may have one or more application specific integrated circuits (ASICs) that may include a modified egress VLAN (EGR_VLAN) table 135 for indicating RR setting status for service channels (S-channels) identified by port and service tag (S-tag). In one embodiment, the table 135 may comprise one or more Ternary content addressable memory (TCAM), or other hardware devices.

Figure 5:
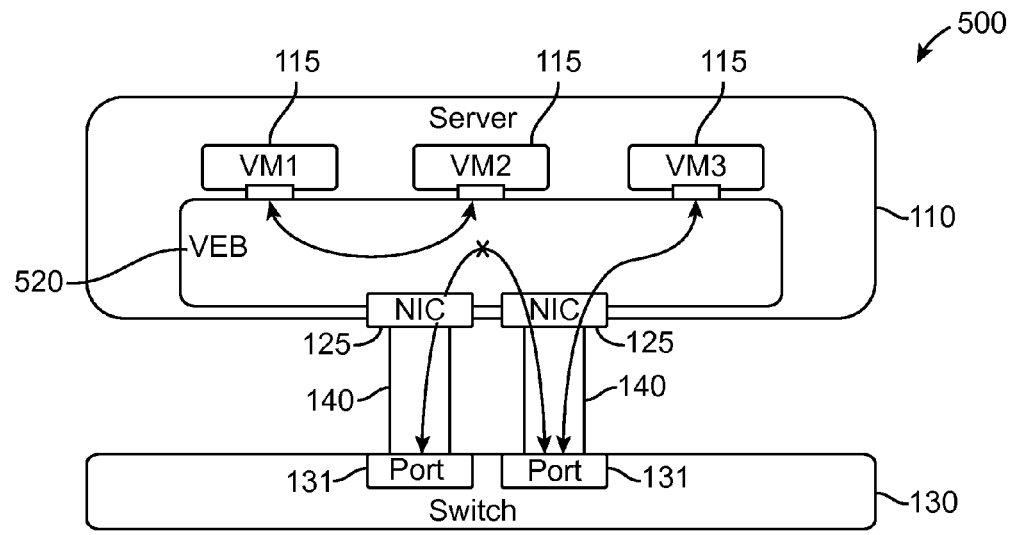
FIG. 5 illustrates a block diagram of an EVB system showing VEB mode, in accordance with an embodiment of the invention.

FIG. 5 illustrates a block diagram of an EVB system 500 showing VEB mode 520, in accordance with an embodiment of the invention. VEBs mode 520 allows VM network traffic to be switched internally to the hypervisor host (e.g., hypervisor 111, FIG. 4) whenever the network traffic is between VM's on the same host.

Figure 6:
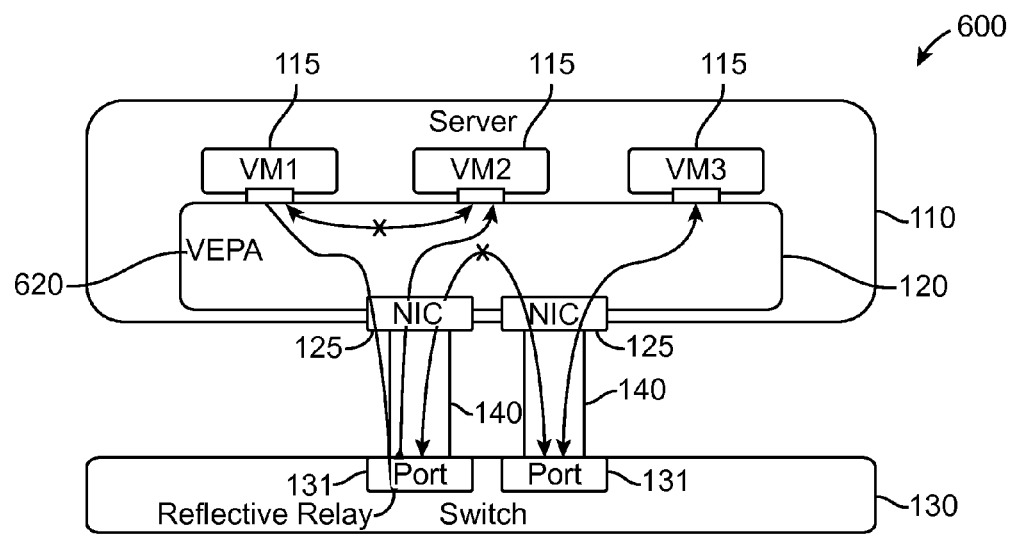
FIG. 6 illustrates a block diagram of an EVB system showing VEPA mode, in accordance with an embodiment of the invention.

FIG. 6 illustrates a block diagram of an EVB system 600 showing VEPA mode 620, in accordance with an embodiment of the invention. System 600 shows how VM1 115 and VM2 115 communicate with each other under VEPA mode 620. RR is negotiated in EVB Link Layer Discovery Protocol (LLDP) trace EVB type, length and value (TLV) between the switch 130 and the server 110.

Figure 7:
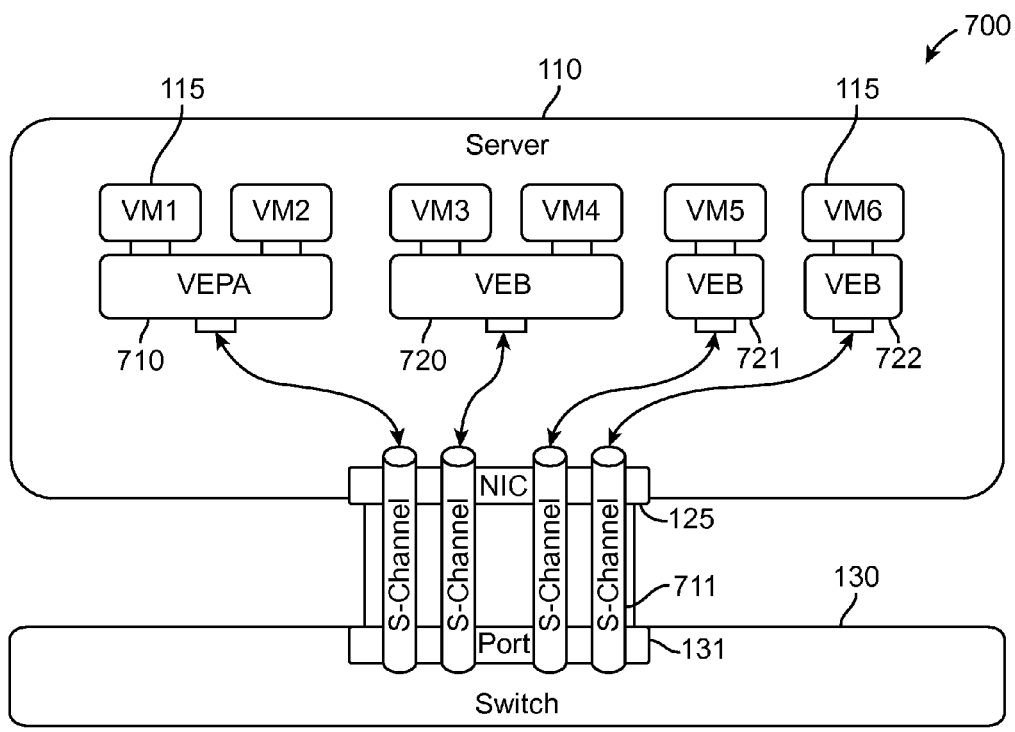
FIG. 7 illustrates a block diagram of an EVB system showing use of S-channels, in accordance with an embodiment of the invention.

FIG. 7 illustrates a block diagram of an EVB system 700 showing use of S-channels 810, in accordance with an embodiment of the invention. The EVB standard supports VEPA-based switches and existing VEB (vSwitch) architectures simultaneously. Architects may choose whether to manage the server-network edge traffic in the local hypervisor (VEB vSwitch) or in the adjacent physical switch 130 (VEPA-based switch). VEPA technology alone does not satisfy all use cases. S-channel technology adds an enhanced tagging mechanism to the basic VEPA technology. S-channel benefits the following use cases: hypervisor functions that need direct access to the hardware NIC 125, VMs 115 that require direct access to the hardware NIC 125, sharing a physical network connection between multiple virtual switch types (VEB and VEPA) to optimize local, VM-to-VM performance, directly mapping a VM 115 that requires promiscuous mode operation.

S-channel technology uses existing Service VLAN tags (S-Tags) from the "Provider Bridge" or "Q-in-Q" standard (IEEE 802.1ad). The VLAN tags allow logically separating traffic on a physical network connection or port (e.g., an NIC device) into multiple channels. Each logical channel operates as an independent connection to the external network. S-channel also defines two port-based, link-level protocols: channel Discovery and Configuration Protocol (CDCP) allows the switch discovery and configuration of the virtual channels. CDCP uses LLDP and enhances it for servers and external switches; Virtual Switch Interface Discovery Protocol (VDP) and its underlying Edge Control Protocol (ECP) provide a virtual switch interface that sends the required attributes for physical and virtual connections to the external switch. VDP/ECP also lets the external switch validate connections and provides the appropriate resources.

Each of the S-channels 711 are isolated by an S-tag (e.g., an additional header), which is inserted into each packet on the port. If VEPA mode 710 and VEB mode 720, 721 and 722 exist simultaneously on the same port 131 of the switch 130, it means VEPA mode 710 should support RR while VEB should not support RR. Typically, RR is an attribute of per port, not per channel. RR must be configured on a switch 130 that receives VM aggregated packets, such as VEPA packets, because some of these packets might be sent back to the server 110 destined for another VM 115 on the same server 110. RR returns those packets to the original device using the same downstream port that delivered the packets to the switch 130.

Figure 8:
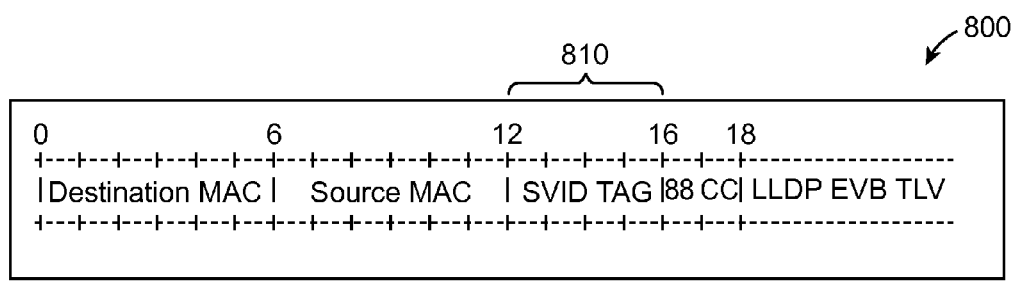
FIG. 8 illustrates a link layer discovery protocol (LLDP) packet format, in accordance with an embodiment of the invention.

FIG. 8 illustrates a LLDP packet format 800, in accordance with an embodiment of the invention. In one embodiment, the LLDP packet format includes fields for a service virtual local area network (VLAN) identification (SVID) tag for exchanging EVB LLDP trace EVB type, length and value (TLV) exchange per S-channel.

Figure 9:
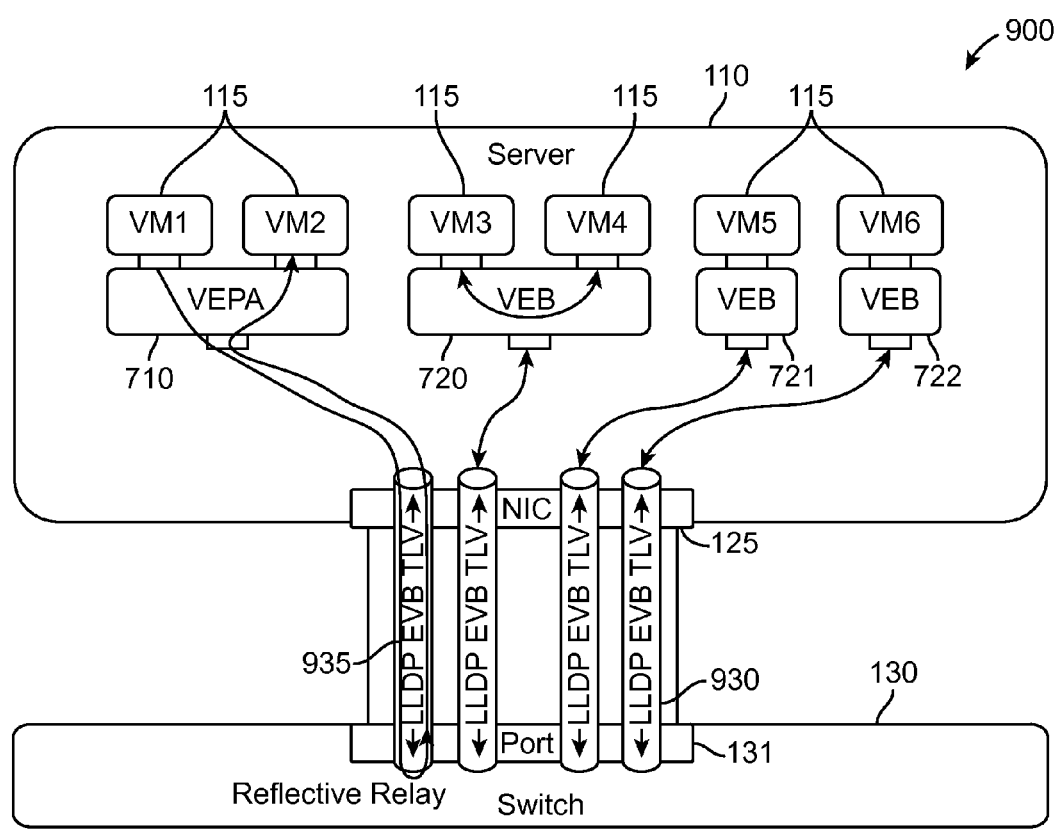
FIG. 9 illustrates a block diagram of an EVB system showing use of LLDP EVB trace EVB type, length and value (TLV) exchange per S-channel, in accordance with an embodiment of the invention.

FIG. 9 illustrates a block diagram of an EVB system 900 showing use of LLDP EVB TLV exchange per S-channel 930, in accordance with an embodiment of the invention. According to 802.1Qbg, s-channel discovery and configuration protocol (CDCP) is used to setup S-channels. In one embodiment, each S-channel is assigned an s-channel identifier (SCID) as an identifier, and SVID is used as a VLAN ID, service VLAN identifier (SVID) for isolating each S-channel in the same port. Packets in each S-channel 930 are tagged with an SVID, except the default S-channel. In one embodiment, after one S-channel is created, if the hypervisor host-internal switch is configured in VEPA mode 710 and connected to this S-channel 935, RR-capability needs to be negotiated on this S-channel 935. In one embodiment, LLDP EVB TLV is used for negotiate capability, which includes RR-capability (on S-channel 935) between server NIC 125 and the switch port 131. In one embodiment, the SVID TAG 810 in the LLDP packet is used to provide an LLDP EVB TLV exchange per S-channel.

FIG. 10 illustrates a representation of a VLAN table 1000. In typical EVB systems that use a port table (PORT_TABLE), RR is an attribute that is only associated per port. The port table is used to set attribution of ports. In the port table, the PORT_RR bit is used to set RR attribution. The VLAN table 1000 in hardware (that may be part of an ASIC connected with a physical switch 130) is known as an EGR_VLAN table, which is used to set attribution of VLANs. In the VLAN table, the PORT_BITMAP indicates the port members that belong to this VLAN FIG. 11 illustrates a representation of a modified EGR_VLAN table 1100, in accordance with an embodiment of the invention. S-channels are indentified by port and S-VLAN. In one embodiment, in order to support RR attribution per S-channel, a PORT_RR_BITMAP 1110 is added in the EGR_VLAN table 1100 to indicate if RR is set for the S-channels <Ports, S-VLAN>. In one embodiment, the number of PORT_RR_BITMAP bits is the same as PORT_BITMAP. In one embodiment, in the extended EGR_VLAN table 1100, if RR attribution is set for S-channel <port, s-tag>, EGR_VLAN[s-tag].PORT_RR_BITMAP[port-1] would be set (the numbering of the port start from 1). In one example embodiment, if the ASIC that the EGR_VLAN table 1100 is implemented on supports 64 physical ports, then the number bits of PORT_BITMAP and PORT_RR_BITMAP are both 64 bits. In one example, if RR attribution is set for S-channel <32, 4000>, EGR_VLAN[4000].PORT_RR_BITMAP[31] would be set.

FIG. 12 illustrates a format 1200 of a PORT_RR_BITMAP bitmap in the EGR_TABLE 1100, in accordance with an embodiment of the invention.

FIG. 13 illustrates a block diagram showing a process 1300 for an RR per port for typical EVB systems. If traffic is forwarded to the typical EVB system ingress port in block 1310, a look-up at block 1320 of a forwarding database (FDB) is made. In block 1330, it is determined whether the egress port number is equal to the ingress port number. Process 1300 continues to block 1340 if it was determined that the egress port number is not equal to the ingress port number, and the traffic is forwarded to a normal switch. Process 1300 continues to block 1350 if it was determined that the egress port number is equal to the ingress port number. In block 1350, the hardware checks if PORT_TABLE[port].PORT_RR bit is set. If the bit is set, the traffic would be forwarded to this port in block 1355 (i.e., RR), else the traffic would be dropped in block 1356 (i.e., no RR).

FIG. 14 is a block diagram showing a process 1400 for RR per S-channel, in accordance with an embodiment of the invention. In one embodiment, the process 1400 processes blocks 1310-1340 similar to process 1300 (FIG. 13). In one embodiment, if the egress port number is equal to the ingress port number, process 1400 continues to block 1410. In one embodiment, in block 1410, it is determined whether the egress channel is equal to the ingress channel. If it is determined that the egress channel is not equal to the ingress channel, process 1400 proceeds to block 1415 where traffic is forwarded to the channel. If it is determined that the egress channel is equal to the ingress channel, process 1400 continues to block 1420. In one embodiment, in block 1420, the hardware checks if EGR_VLAN[s-tag].PORT_RR_BITMAP[port-1] is set. In one embodiment, if the bit is set, process 1400 continues to block 1430 where the traffic is forwarded to this port and sent out with the s-tag, else process 1400 continues to block 1440 where the traffic is dropped.

The system 100 using embodiments of the invention may include one or more source programs, executable programs (object code), scripts, or any other entity comprising a set of computer program instructions to be performed. When the system 100 includes a source program, then the program is usually translated via a compiler, assembler, interpreter, or the like, which may or may not be included within a storage device. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In one embodiment, where the system 100 is implemented in hardware, the system 100 can be implemented with any one or a combination of the following technologies, which are each well known in the art: a discrete logic circuit(s) having logic gates for implementing logic functions upon data signals, an ASIC having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method comprising:
providing a virtual edge bridge (VEB) mode and a virtual Ethernet port aggregator (VEPA) mode in an edge virtual bridging (EVB) system on a same port of a physical switch;
negotiating reflective relay (RR) capability between a server and the physical switch in the EVB system, wherein a connection between the server and the physical switch comprises a plurality of logical channels, the RR capability being negotiated for each of the logical channels; and
supporting RR on the physical switch of the EVB system on a per channel basis, wherein RR is supported for a logical channel using RR setting information indicating an RR setting status for the logical channel.

2. The method of claim 1, wherein negotiating RR capability per channel comprises using a service virtual local area network (VLAN) identification (SVID) tag in a link layer discovery protocol (LLDP) packet for exchanging EVB LLDP trace EVB type, length and value (TLV) exchange per service channel (S-channel).

3. The method of claim 2, wherein the LLDP packet format includes fields for the SVID tag and fields for LLDP EVB TLV.

4. The method of claim 3, wherein supporting RR per channel on the physical switch comprises supporting RR per S-channel.

5. The method of claim 4, wherein an extended table includes the RR setting information.

6. The method of claim 4, wherein the RR setting information is included in a modified egress VLAN (EGR_VLAN) table for indicating RR setting status for S-channels identified by port and service tag (S-tag).

7. The method of claim 6, further comprising:
forwarding traffic to an ingress port of the physical switch;
determining if the RR setting status for a particular S-channel that is associated with a particular port and S-tag is set in the modified (EGR_VLAN) table; and if the RR setting for the particular S-channel is set, forwarding the traffic to the particular port and sending out the traffic with the S-tag, otherwise dropping the traffic.

8. The method of claim 1, wherein the VEB mode and the VEPA mode simultaneously exist in the EVB system on the same port of the physical switch.

9. A computer program product for reflective relay (RR) processing on logical ports for channelized links in an edge virtual bridging (EVB) system, the computer program product comprising a non-transitory computer readable storage medium having program code embodied therewith, the program code readable/executable by a processor to perform a method comprising:

providing, by a server, a virtual edge bridge (VEB) mode and a virtual Ethernet port aggregator (VEPA) mode in the EVB system on a same port of a physical switch;

negotiating, by the server, RR capability between the server and the physical switch in the EVB system, wherein a connection between the server and the physical switch comprises a plurality of logical channels, the RR capability being negotiated for each of the logical channels; and supporting RR on the physical switch of the EVB system on a per channel basis, wherein RR is supported for a logical channel using RR setting information indicating an RR setting status for the logical channel.

10. The program of claim 9, wherein negotiating RR capability per channel comprises using a service virtual local area network (VLAN) identification (SVID) tag in a link layer discovery protocol (LLDP) packet for exchanging EVB LLDP trace EVB type, length and value (TLV) exchange per service channel (S-channel).

11. The program of claim 10, wherein the LLDP packet format includes fields for the SVID tag and fields for LLDP EVB TLV.

12. The program of claim 11, wherein supporting RR per channel on the physical switch comprises supporting RR per S-channel.

13. The program of claim 12, wherein the RR setting information is included in a modified egress VLAN (EGR_VLAN) table for indicating RR setting status for S-channels identified by port and service tag (S-tag).

14. The program of claim 13, further comprising:

forwarding, by the server, traffic to an ingress port of the physical switch;

determining if the RR setting status for a particular S-channel that is associated with a particular port and S-tag is set in the modified (EGR_VLAN) table; and if the RR setting for the particular S-channel is set, forwarding the traffic to the particular port and sending out the traffic with the S-tag, otherwise dropping the traffic.

15. An edge virtual bridging system comprising:

a physical switch; and a physical end station including a hypervisor, wherein the physical end station provides a virtual edge bridge (VEB) mode and a virtual Ethernet port aggregator (VEPA) mode on a same port of the physical switch, the physical end station further negotiates reflective relay (RR) capability with the physical switch, wherein a connection between the server and the physical switch comprises a plurality of logical channels, the RR capability being negotiated for each of the logical channels, and supports RR on the physical switch on a per channel basis, wherein RR is supported for a logical channel using RR setting information indicating an RR setting status for the logical channel.

16. The system of claim 15, wherein the physical end station negotiates RR capability per channel with the physical switch using a service virtual local area network (VLAN) identification (SVID) tag in a link layer discovery protocol (LLDP) packet for exchanging EVB LLDP trace EVB type, length and value (TLV) exchange per service channel (S-channel).

17. The system of claim 16, wherein the LLDP packet format includes fields for the SVID tag and fields for LLDP EVB TLV.

18. The system of claim 17, wherein the physical end station supports RR per channel on the physical switch by supporting RR per S-channel, and the RR setting information is included in a modified egress VLAN (EGR_VLAN) table for indicating RR setting status for S-channels identified by port and service tag (S-tag).

19. The system of claim 18, wherein the physical end station forwards traffic to an ingress port of the physical switch, determines if the RR setting status for a particular S-channel that is associated with a particular port and S-tag is set in the modified (EGR_VLAN) table, and if the RR setting for the particular S-channel is set, forwards the traffic to the particular port and sends out the traffic with the S-tag, otherwise drops the traffic.

20. The system of claim 19, wherein an application specific integrated circuit (ASIC) includes the modified EGR_VLAN table, wherein the ASIC is coupled to the physical switch.

* * * * *